United States Patent
Bentivoglio

[19]

[11] Patent Number: 6,065,953
[45] Date of Patent: May 23, 2000

[54] HEATED DIE LIPS SYSTEM

[76] Inventor: Alfredo Bentivoglio, 3038 Plum Tree Crescent, Mississauga, Ontario, Canada, L5N 4W6

[21] Appl. No.: 09/179,679

[22] Filed: Oct. 16, 1998

Related U.S. Application Data

[63] Continuation-in-part of application No. 08/863,944, May 28, 1997.
[51] Int. Cl.[7] .............................. B29C 47/86; B29C 47/88
[52] U.S. Cl. ...................... 425/143; 425/378.1; 425/392; 425/DIG. 13
[58] Field of Search ................................ 425/378.1, 72.1, 425/141, 143, DIG. 13, 392; 264/40.6

[56] References Cited

U.S. PATENT DOCUMENTS

| | | | |
|---|---|---|---|
| 4,830,595 | 5/1989 | Bentivoglio et al. | 425/143 |
| 4,842,504 | 6/1989 | Bentivoglio et al. | 425/143 |

*Primary Examiner*—David A. Simmons
*Assistant Examiner*—Robert A. Hopkins
*Attorney, Agent, or Firm*—Anthony Asquith & Co.

[57] ABSTRACT

The die-lip is heated by an electric heater cable wrapped into a groove positioned close to the lip. The heater cable is pressed radially against the lip-side of the groove by many individual Vee-shaped spring-clips, which are arranged in a contiguous series around the circumference of the groove.

12 Claims, 3 Drawing Sheets

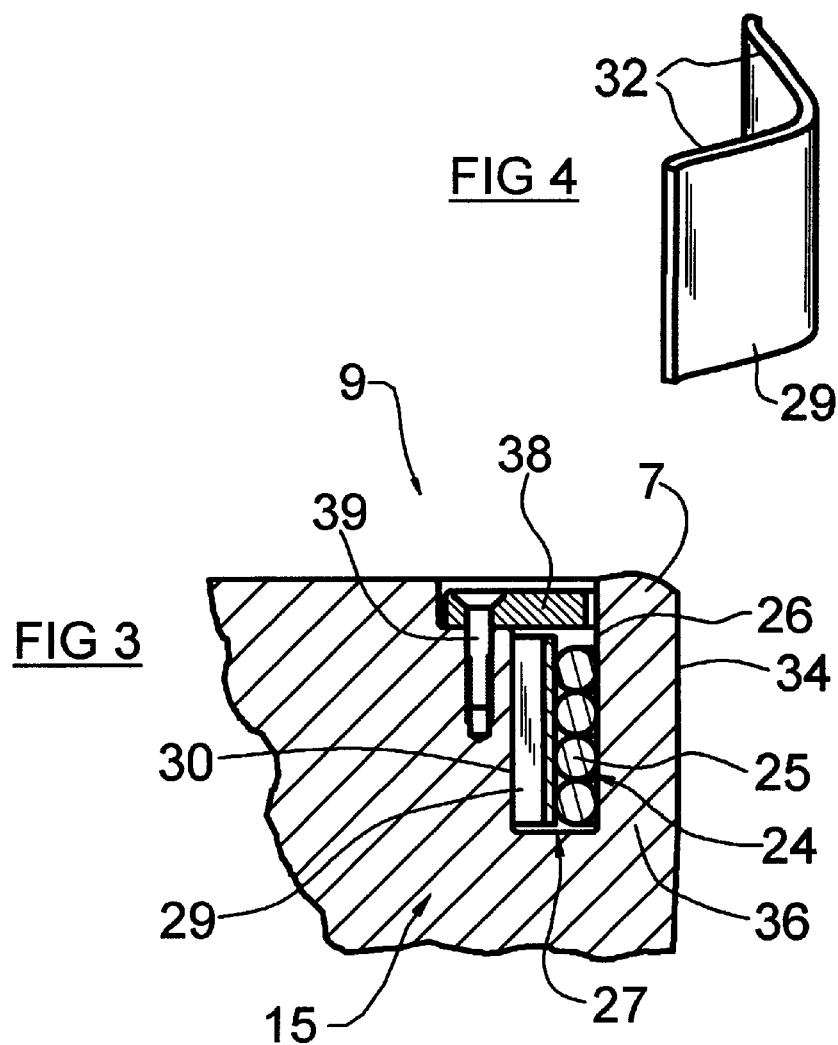
FIG 4
FIG 3
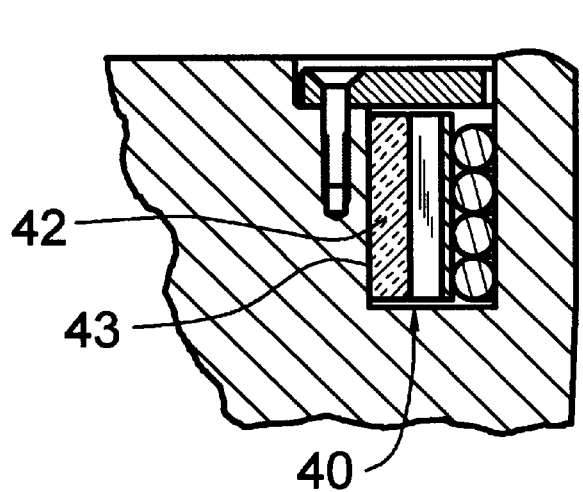
FIG 5
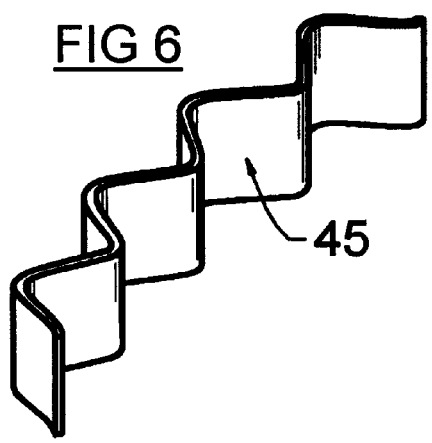
FIG 6

HEATED DIE LIPS SYSTEM

This application is a continuation in part of Ser. No. 08/863,944, filed May 28, 1997.

This invention relates to the extrusion of plastic sheet or film. Conventionally, plastic film is manufactured by extruding liquid plastic through an annular nozzle. It is known to provide a means for heating the lips of the nozzle, such means being more or less effective to defer the onset of melt surface-fracture.

BACKGROUND TO THE INVENTION

The designer of a blown-film extrusion die needs to bear in mind the following requirements:

1. the plastic film should be of high quality—which means that the surface of the sheet should be smooth and transparent;
2. production should be done economically—which means that the velocity with which the plastic melt emerges from the annular nozzle should be maximised.

These two requirements are in conflict, in that as the melt-emergence velocity is increased, so the likelihood of surface-fracture is increased. Surface-fracture is a quality fault, in which the surface of the plastic film becomes crazed, or fogged.

It is known that the onset of surface-fracture can be deferred by increasing the temperature of the plastic melt. However, increasing the temperature of the melt, as it emerges from the nozzle, introduces further difficulties, and it is known that the better approach is to increase the temperature of just the surface of the melt, while leaving the bulk of the melt at a cooler temperature. This is done conventionally by means of heaters installed on the lips of the nozzle, i.e by so-called die-lip heaters.

If the bulk of the plastic melt were too hot, the emerging bubble would be too liquid (i.e too runny), whereby the bubble would become difficult to control. The cooler the melt, the more the melt has some degree of ability to support itself, and the more the bubble tends to behave in a predictable and controllable manner.

The viscosity of hot melt is very sensitive to temperature. Adding a few degrees to the temperature of just the surface of the melt, while leaving the main flow of the melt relatively cool, means that the surface can be considerably less viscous (i.e more liquid) than the main flow. It has been suggested that die-lip heaters are effective because the increased liquid-ness of the surface of the melt lubricates the die-lips, thereby easing the melt surface through the nozzle, and thereby deferring the onset of surface-fracture.

The invention is aimed at providing an improved system for heating the die-lips.

The invention is aimed at providing a manner of mounting the heating element, in which heat from the element is transferred to the die-lip evenly all around the circumference of the die-lip, and in which the rest of the bulk of the die is insulated therefrom.

The annular nozzle includes, of course, both an inner lip and an outer lip. Usually (though not always) heaters would be fitted on both die-lips.

THE PRIOR ART

Prior examples of die-lip heaters for blown-film extrusion dies are shown in, for example, patent publications U.S. Pat. No. 4,830,595 and U.S. Pat. No. 4,842,504.

GENERAL FEATURES OF THE INVENTION

The invention lies in providing a spring-means, within the heater groove, for forcefully pressing the heater-element in a radial direction, into heat-transmitting contact with the lip-side-surface of the heater-groove; for pressing the heater-element against the lip-side-wall of the heater-groove at many individual and discrete points; for pressing the heater-element uniformly and evenly, with respect to the circumference of the heater-groove, in that the said many points are pitched in close-spaced adjacency, regularly and evenly around the circumference; and for pressing the heater element against the lip-side-wall with a force that is substantially the same at each of the said many points.

Preferably, the many points are approximately fifty or more in number, and are pitched approximately 2 cm apart around the circumference.

In a preferred form of the invention, as described herein, the spring-means comprises many individual spring-clips, which are arranged in a contiguous series within the heater-groove, between the heater-element and the bulk-side-wall of the heater-groove. The individual spring-clips comprise respective pieces of metal, each folded to a Vee-shape, defined by arms and an apex. The apex of the Vee lies in contact with the heater-element, and the arms of the Vee lie in contact with the bulk-side-wall of the heater-groove.

Preferably, a heat-insulation means is provided, for insulating the bulk-side-wall of the heater-groove from the heater element, which comprises the air spaces between the spring-clips.

Preferably, the heater-element comprises a length of heater cable, arranged in a coil of two or more turns, and the turns lie against the lip-side-wall of the heater-groove in a vertical stack, and preferably the spring-clip and the heater cable are loose in the axial sense within the heater-groove.

Preferably, the cross-sectional configuration of the spring-clip at any one depth within the heater-groove is the same as the cross-sectional configuration of the spring-clip at any other depth within the heater-groove.

The invention is applicable advantageously when the die-lip is formed integrally with the material of the bulk of the die, and is joined thereto by a narrow root.

DETAILED DESCRIPTION OF PREFERRED EMBODIMENTS

By way of further explanation of the invention, exemplary embodiments of the invention will now be described with reference to the accompanying drawings, in which:

FIG. 3 is a close-up of a die-lip heater assembly of the apparatus of FIG. 1;

FIG. 4 is a pictorial view of one of many spring-clips used in the apparatus of FIG. 1;

FIG. 5 is a view corresponding to that of FIG. 3, of another die-lip heater assembly;

FIG. 6 is a view corresponding to that of FIG. 4, of another type of spring-clip.

The apparatuses shown in the accompanying drawings and described below are examples which embody the invention. It should be noted that the scope of the invention is defined by the accompanying claims, and not necessarily by specific features of exemplary embodiments.

Figure 1:
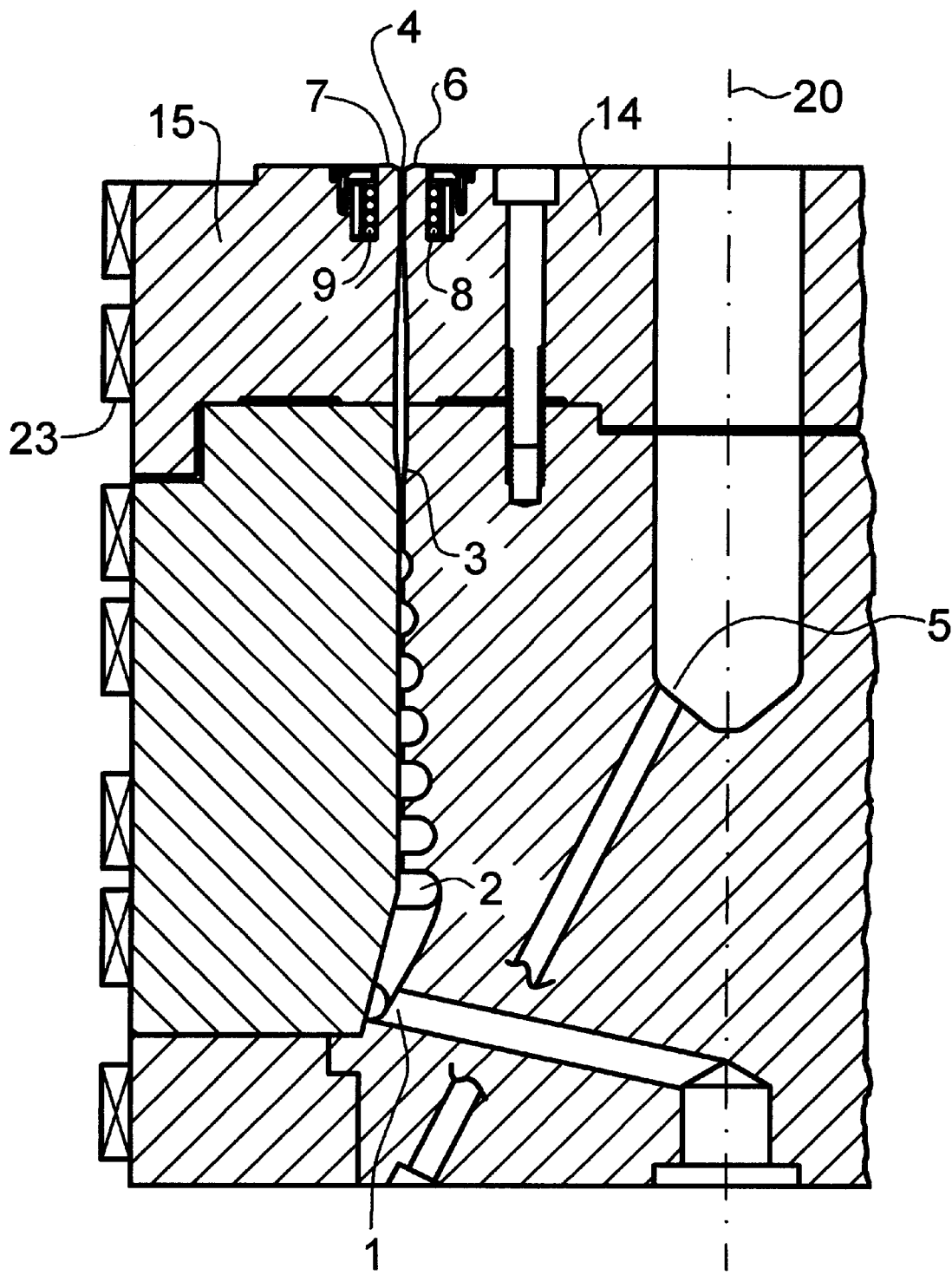
FIG. 1 is a cross-section of part of an extrusion die apparatus, which is fitted with die-lip heaters that embody the invention.
Figure 2:
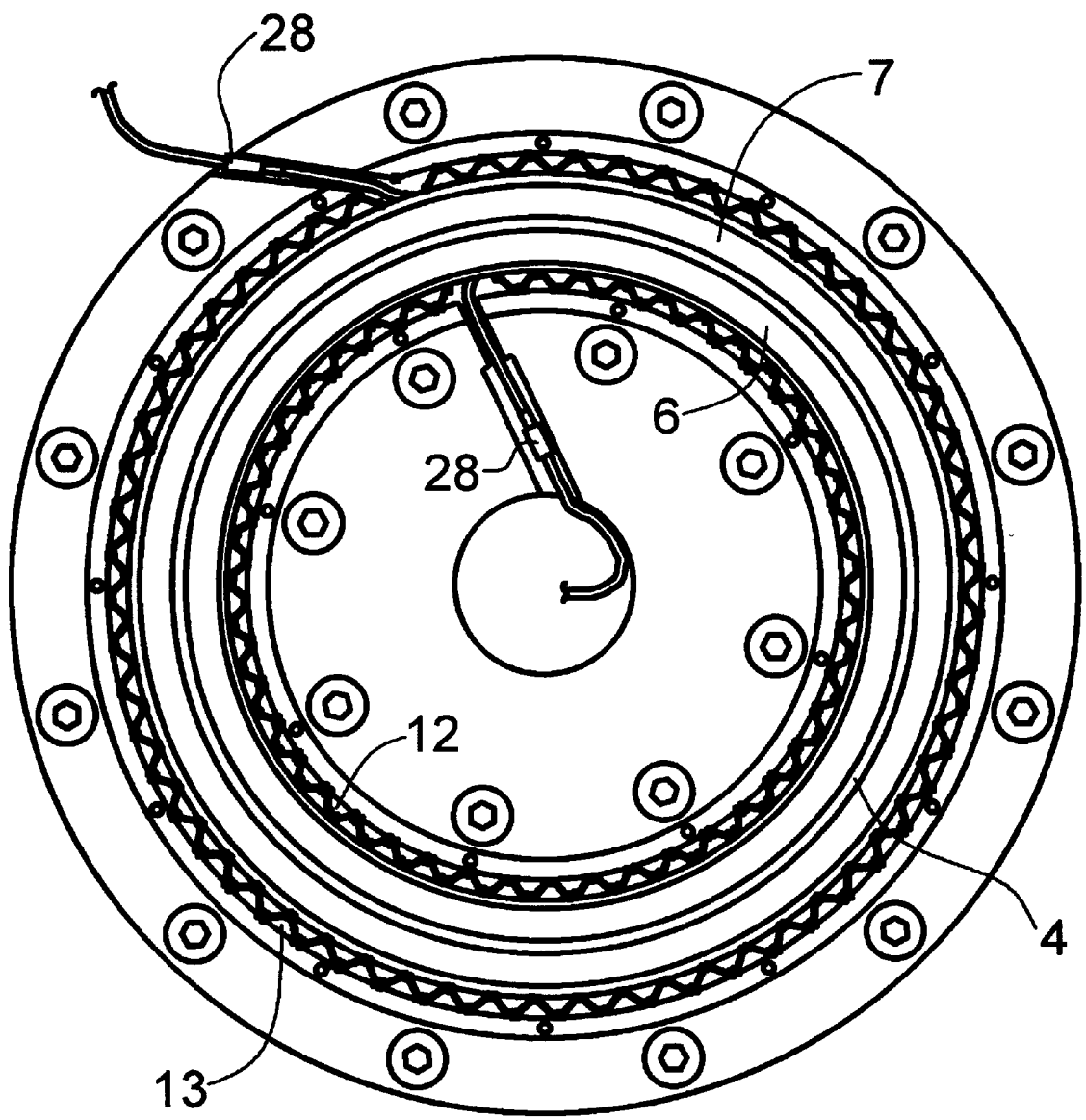
FIG. 2 is a plan view of the apparatus of FIG. 1.

The die shown in FIGS. 1 and 2 includes a hollow-cylindrical outer die structure 15, and a cylindrical inner die 14. The cylindrical axis is indicated at 20.

These two dies define an annular nozzle 4 therebetween. Plastic melt is fed into the space between the inner and outer dies through a conduit 1, spiral channels 2, and collecting channel 3, before passing (upwards) through and out of the nozzle 4.

The nozzle 4 comprises an inner lip 6 and an outer lip 7. These lips are heated by means of the die-lip heater assemblies 8,9. The massive bulk of the outer die 15 is heated by means of external heaters 23; further heaters (not shown) may be provided on the inside wall of the inner die 14. The fact that the die is made of metal, and is a massive bulk, ensures that the temperature within the bulk of the die is uniform or even.

The performance of the die depends on the temperature of the metal of the die being kept within preset limits—and, perhaps more importantly, being kept uniform, sector to sector, around the die. The die-lip heaters 8,9 are intended to elevate the temperatures of only the lips 6,7 themselves, without affecting the temperatures of the rest of the dies. The designer must be concerned that the temperature around the die-lips, sector to sector, is kept uniform.

Uniformity of temperature is one of the key factors in the design of a die-lip heater. The designer must make sure the temperature of the die-lip is constant, all the way round its circumference. Given that the heater comprises an electrical heating element: first, the element that is to be used should be selected on the basis of its uniformity of heating, along its length; second, the manner of mounting the element at the die-lip must be such that heat from the element is transferred evenly to the metal of the lip.

The problem of ensuring evenness of temperature is a difficult one, in that the nozzle of an extrusion die (that is to say, a die of the type in which the provision of die-lip heaters would be contemplated) can be, for example, 50 cm in diameter, or 150 cm in circumference. The die-lip that is to be heated comprises the final 1 or 2 cm of the axial length of the nozzle. Thus, the die-lip comprises a stripe, or band, which is 150 cm long and 1 or 2 cm wide; and the task of ensuring that the lip lies at a consistent few degrees above the temperature of the massive bulk of the rest of the die, is a difficult one for the designer. The designer should strive to keep the temperature variation between the north side of the die-lip, and the south side, down to no more than a degree or two.

It is important that the effects of the die-lip heater be confined to the die-lip. That is to say, the heated die-lips should be insulated from the main bulk of the die, whereby the bulk of the die can be kept relatively cooler than the die-lips.

The above factors are reflected in the design of die-lip heater as depicted herein. The heater assembly 9, a cross-section of which is shown in close-up in FIG. 3, includes a spiral coil 24, of heater element cable 25, the turns of which are wrapped around the lip-side-surface 26 of the heater-groove 27. The electrical supply connection to the coil 24 is shown at 28 in FIG. 2. The connection point 28 might possibly be a source of unevenness of temperature, and the designer should see to it that the coil 24 has a sufficient number of turns that any local effects due to the presence of the connection feed 28 are smoothed out, i.e that the local effects of the connection do not become manifest as a difference in temperature of a local sector of the die-lip.

Also included in the heater assembly 9 is a means for pressing the turns of the heater element cable 25 against the lip-side-surface 26 of the heater-groove 27. The means comprises a series of Vee-shaped springs 29. The springs are many in number, for example fifty or seventy springs, per groove.

An individual one of the springs is shown in FIG. 4. Each spring-clip 29 is inserted into the heater-groove 27, in such a manner that the apex of the spring bears against the bulk-side-surface 30 of the heater-groove, and the arms 32 of the spring press the turns of the heater coil 24 against the lip-side-surface 26 of the heater-groove.

The lips 6,7 comprise the annular promontories lying between the lip-side-surfaces 26 of the heater-grooves 27 and the inner and outer lip-faces 34,35 of the nozzle 4. Thus, the lip is connected to the bulk of the die via the narrow root 36; because of this configuration of the lip, the lip is effectively isolated, and insulated, from the bulk of the die. That is to say, because of the shape of the lip, it is recognised that it is physically possible for the lip to attain a temperature that is several degrees higher than that of the bulk of the die. To take advantage of this capability, the designer must see to it that the heat supplied by the heater assembly 9 is directed into the lip 7, and is inhibited from entering the bulk of the die. Thus, the designer should seek to provide a means to press the heater element against the lip-side of the heater-groove, and to thermally-insulate the heater element from the bulk-side of the heater-groove.

The Vee-shaped springs 29 serve as such a means. As a result of the configuration of the springs, the turns of the heater element are separated from the bulk-side-surface 30 of the groove by a wide air space. Of course, the springs 29 do touch the bulk-side-surface of the groove, but only over a thin line 37, whereby the transfer of heat through the spring from the heater to the bulk of the die can be regarded as minimal.

Whatever heat passes to the bulk of the die from the heated lip can be regarded as having passed either through the narrow root 36 of the lip, or through the springs 29, and both of those heat-transmission pathways are relatively restricted.

(It might be regarded that the annular promontory that comprises the lip could be formed as a separate piece from the bulk of the die. The separate piece could be secured to the bulk of the die by some means that insulated the lip from the bulk of the die. However, making the lip out of a separate piece is not favoured, because of the difficulty of achieving a smooth transition between the surface of the collecting channel 3 and the lip-faces 34,35 of the nozzle. The slightest protrusion, mis-match, or other imperfection at such a location, being so close to the point of emergence of the melt, could well have a disastrous effect on the quality of the manufactured film. Also, such a problem would be difficult to correct, if it were to occur. However, making the lip from a separate piece is not ruled out.)

The arms 32 of the Vee-shaped springs 29 are resilient. As emphasized previously, a key factor in the performance of the die is that the temperature around the circumference of the nozzle should be as even as possible. Therefore, the force with which the turns are pressed against the lip-side-surface 26 of the groove should be as uniform as possible. The heater element is selected, per se, on the basis that during operation the temperature along its length is very even; and it is no less important to ensure that the heater is pressed against the lip-side of the groove very evenly.

The heater element 25 is flexible, in the sense that the element can be bent into curves, i.e curves of the kind of radius likely to be encountered in blown-film extrusion-die nozzles. However, the element is not so flexible that it has no resistance to being pressed against the sides of the grooves. In fact, in order to ensure that the coils are pressed against the sides of the groove uniformly and evenly, the coils must be pressed quite hard—if the springs were light, i.e if the springs pressed the coils of the heating element against the sides of the groove only lightly, the inherent lack of flexibility of the coils would mean that the contact forces would be quite uneven. In other words, one of the keys to pressing the coils evenly against the side of the groove is to press the coils hard against the side of the groove.

Each spring must press the coil against the side of the groove with a large force, i.e with a force that is sufficiently large that the variations in the force due to the inherent stiffness of the elements are negligible by comparison.

Equally, the large force exerted by the springs 29 should be the same, spring to spring. Therefore the springs should have the proper degree of resilience. (Resilience is quantified as the spring-rate of the spring, i.e as the force required to deflect the spring a given distance.) It is recognised that, given the context of extrusion die manufacture, the fitted lengths of all the springs are, accurately, all the same. Therefore, the requirement for resilience is not very demanding. It is recognised that the requirement that all the springs 29 have to exert more or less the same force, when fitted, can be met even though the springs might have quite a high spring-rate.

The springs 29 being high-rate, assembly is easy. It may be noted that the only access for assembling the spring is through the open top of the groove. The springs can be started into the grooves, by hand, and then the springs can be levered or hammered down into their fitted positions in the grooves. Ease of assembly of the springs is of course a concern, given the large number of springs.

The springs 29 are assembled into the heater-groove one by one. Each extra spring is inserted alongside the previous spring, until finally a complete encirclement of the heater coil is assembled in place. Generally, the springs are resilient enough that the final spring can be squeezed in, leaving no gaps around the groove.

It is noted that each spring is of simple construction, being simply cut from strip and then pressed into the angled Vee-shape. The springs add little cost to the die, even though there are so many of them.

It is noted that it would be difficult (and expensive) to manufacture the spring means in the form of a whole ring, i.e as a complete encirclement in one resilient piece.

The coil comprises at least two, and preferably four or so turns of the heater element 25, and each turn has to be pressed equally against the lip-side-surface of the groove. Ideally, the spring should equalize its contact forces between all four turns. That is to say, the bottommost turn of the coil should be pressed against the side of the groove with the same force as the topmost turn. However, it is recognised that the heater-groove in an extrusion die will inevitably be cut with a high degree of accuracy, and as a result the spring arms can be expected to press against all four turns with a nearly equal force. The designer should see to it, however, that the cross-sectional configuration of the spring at any one height within the groove is the same as the cross-sectional configuration of the spring at any other height: a condition which of course obtains in the design as depicted herein.

The turns of the coil, and the many springs, are held in place in the groove by means of a clip-ring 38. The clip-ring can be machined as a complete circle, or in sectorial parts. The clip-ring 38 is secured with bolts 39. The springs and coils should be loose (i.e loose in the vertical or axial sense) within the heater-grooves: if the springs and coils were compressed downwards against the bottoms of the grooves, some unwanted heat transfer might take place. Alternatively, insulating material can be placed in the bottom of the groove.

To facilitate heat transfer to the lip-side-surface 26 of the heater-groove 27, a quantity of a heat-conductive paste can be smeared over the lip-side-surface before the coils are pressed thereto.

FIG. 5 shows a variation of the heater assembly. The groove 40 is now wider, in order to accommodate a ring 42 of insulative material between the apex of the spring 29 and the bulk-side-surface 43 of the groove 40. The ring 42 can be a complete encirclement, or can be in sectorial sections for ease of manufacture. The fact that the spring 29 is not now in direct contact with the bulk-side-surface 43 can result in the lip running a few more degrees hotter than the surrounding bulk of the die.

FIG. 6 shows a variation in the manner of construction of the springs. Here, the effect of several individual Vee-shaped springs is provided by bending a strip of steel 45 into a concertina configuration.

What is claimed is:

1. Apparatus for use in producing plastic film by extrusion, wherein:

the apparatus includes an inner die and an outer die;

the outer die has an inside cylindrical surface, and the inner die has a complementary opposing outside cylindrical surface;

the inside and outside surfaces together define an annular nozzle;

in respect of at least one of the dies:

the die comprises a massive bulk of material of generally cylindrical-annular form;

the die is provided with a deep, annular heater-groove, which is located in close proximity to the cylindrical surface thereof;

the heater-groove includes a lip-side-wall and a bulk-side-wall, the lip-side-wall being closer to the said cylindrical surface;

a lip of the die comprises the portion of the die that lies between the said cylidnrical surface of the die and the said lip-side-wall of the heater-groove;

the lip is annular, and is of narrow radial width;

the apparatus includes a lip-heater-assembly, which includes a heater element, which is located in the heater-groove of the die;

the apparatus includes a spring-means;

the spring means includes means for forcefully pressing the heater-element in a radial direction, into heat-transmitting contact with the lip-side-surface of the heater-groove;

the spring-means includes means for pressing the heater-element against the lip-side-wall of the heater-groove at many individual and discrete points;

the spring-means includes means for pressing the heater-element uniformly and evenly, with respect to the circumference of the heater-groove, in that the said many points are pitched in close-spaced adjacency, regularly and evenly around the circumfernece;

and the spring-means includes means for pressing the heater element against the lip-side-wall with a force that is substantially the same at each of the said many points.

2. As in claim 1, wherein the many points are approximately fifty or more in number.

3. As in claim 1, wherein the many points are pitched approximately 2 cm apart around the circumference.

4. As in claim 1, wherein the spring-means comprises many individual spring-clips, which are arranged in a contiguous series within the heater-groove, between the heater-element and the bulk-side-wall of the heater-groove.

5. As in claim 4, wherein wherein the individual spring-clips comprise respective pieces of metal, each folded to a Vee-shape, defined by arms and an apex.

6. As in claim 5, wherein, in respect of each spring-clip, the apex of the Vee lies in contact with the heater-element, and the arms of the Vee lie in contact with the bulk-side-wall of the heater-groove.

7. As in claim 1, wherein the apparatus includes a heat-insulation means, for insulating the bulk-side-wall of the heater-groove from the heater element.

8. As in claim 7, wherein:

the spring-means comprises many individual spring-clips, which are arranegd in a contiguous series within the heater-groove, between the heater-element and the bulk-side-wall of the heater-groove;

and air spaces between the spring-clips comprise the said heat-insulation means.

9. As in claim 1, wherein the heater-element comprises a length of heater cable, arranged in a coil of two or more turns, and the turns lie against the lip-side-wall of the heater-groove in a vertical stack.

10. As in claim 4, wherein:

the heater-element comprises a length of heater cable, arranged in a coil of two or more turns, and the turns lie against the lip-side-wall of the heater-groove in a vertical stack;

and the spring-clip and the heater cable are loose in the axial sense within the heater-groove.

11. As in claim 10, wherein the cross-sectional configuration of the spring-clip at any one depth within the heater-groove is the same as the cross-sectional configuration of the spring-clip at any other depth within the heater-groove.

12. As in claim 1, wherein the lip is formed integrally with the material of the bulk of the die, and is joined thereto by a narrow root.

* * * * *